United States Patent
Ikeda

(10) Patent No.: US 7,852,400 B2
(45) Date of Patent: Dec. 14, 2010

(54) IMAGE PICKUP APPARATUS HAVING A MOVABLY CONTROLLABLE NEUTRAL-DENSITY FILTER

(75) Inventor: Takeshi Ikeda, Tokyo (JP)

(73) Assignee: Canon Kabushiki Kaisha (JP)

( * ) Notice: Subject to any disclaimer, the term of this patent is extended or adjusted under 35 U.S.C. 154(b) by 353 days.

(21) Appl. No.: 11/782,026

(22) Filed: Jul. 24, 2007

(65) Prior Publication Data

US 2008/0024653 A1     Jan. 31, 2008

(30) Foreign Application Priority Data

Jul. 28, 2006    (JP)    .............................. 2006-207139

(51) Int. Cl.
*H04N 5/225* (2006.01)
*H04N 5/238* (2006.01)
*G02B 5/20* (2006.01)

(52) U.S. Cl. ...................... 348/361; 348/363; 359/888

(58) Field of Classification Search ................. 358/888; 348/335, 342, 362, 363, 364, 365, 366, 361; 396/505

See application file for complete search history.

(56) References Cited

U.S. PATENT DOCUMENTS 6,927,798 B2 *   8/2005   Kaneda ...................... 348/363
6,930,723 B1 *   8/2005   Tsuda et al. ................. 348/363
2004/0218246 A1 * 11/2004   Onuki et al. ................ 359/234
2007/0248349 A1 * 10/2007   Nanjo ......................... 396/241
2008/0037092 A1 *   2/2008   Umezu et al. ............... 359/227

FOREIGN PATENT DOCUMENTS

JP     2004-072580 A     3/2004

* cited by examiner

*Primary Examiner*—Jason Whipkey
(74) *Attorney, Agent, or Firm*—Rossi, Kimms & McDowell LLP

(57) ABSTRACT

An image pickup apparatus which is capable of preventing light diffraction from being caused by a density step or a thickness step of a filter, thereby preventing degradation of resolution during still image shooting, and securing the dynamic range of exposure control during both moving image shooting and still image shooting. In the image pickup apparatus, an image pickup element converts light incident thereon from a lens into an electric signal. A diaphragm mechanism changes the amount of light incident on the image pickup element. An ND filter covers an aperture of the diaphragm mechanism such that the aperture can be opened and closed, thereby adjusting the amount of light incident on the image pickup element after passing through the aperture. A controller controls a closing operation of the ND filter for closing the aperture, such that the closing operation is performed at different speeds between when a gradation portion of the ND filter covers the aperture and when a transparent portion of the ND filter covers the aperture.

16 Claims, 10 Drawing Sheets

IMAGE PICKUP APPARATUS HAVING A MOVABLY CONTROLLABLE NEUTRAL-DENSITY FILTER

BACKGROUND OF THE INVENTION

1. Field of the Invention

The present invention relates to an image pickup apparatus, such as a video camera, and more particularly to an image pickup apparatus equipped with an ND filter for adjusting the amount of light incident on an image pickup element from the aperture of a diaphragm mechanism.

2. Description of the Related Art

Recently, the cell size of a CCD sensor has been reduced according to reduction of the size of a video camera, and this makes image quality liable to be adversely affected by light diffraction. This results in a decrease in the upper limit of the F number which is indicative of a degree of stopping down of the aperture of a diaphragm mechanism that controls exposure. To reduce adverse influence of the light diffraction on image quality even by a slight degree, differently from the conventional technique in which the diaphragm mechanism and an ND (Neutral Density) filter attached to the diaphragm mechanism are simultaneously controlled, there has been proposed a technique which controls the diaphragm mechanism and the ND filter independently of each other, thereby making it possible to reduce the amount of light with no need to stop down the aperture of the diaphragm mechanism.

FIG. 7 shows an example of an image pickup apparatus that controls the ND filter independently of the diaphragm mechanism.

The image pickup apparatus is comprised of a lens 110, the diaphragm mechanism 120 for controlling the amount of light incident thereon from the lens 110, a CCD sensor 200 for photoelectrically converting light incident thereon from the diaphragm mechanism 120, and the ND filter 160 for limiting the amount of the light incident on the CCD sensor 200 from the diaphragm mechanism 120.

The diaphragm mechanism 120 is driven by a diaphragm-driving motor 130. The diaphragm-driving motor 130 is driven by a diaphragm mechanism-driving device 140. Further, a degree of stopping down of the diaphragm mechanism 120 is detected by a diaphragm mechanism sensor 150.

The ND filter 160 is driven by an ND filter-driving motor 170. The ND filter-driving motor 170 is driven by an ND filter-driving device 180. Further, a state of covering of the diaphragm mechanism 120 with the ND filter 160 is detected by an ND filter sensor 190.

The CCD sensor (image pickup element) 200 is controlled by an image pickup element-driving device 210. The image pickup element-driving device 210 reads out a photoelectrically converted signal from the CCD sensor 200, gives to the CCD sensor 200 a so-called electronic shutter function for controlling a time period over which the signal is stored, and controls the electronic shutter function. The signal photoelectrically converted by the CCD sensor 200 is sampled and electrically amplified by a CODS (Correction Double Sampling/AGC (Automatic Gain Control) 220. An analog signal output from the CDS/AGC 220 is converted to a digital signal by an A/D converter 230, and the digital signal is delivered to a DSP 240.

The DSP 240 is a signal processing device equipped with control functions for performing gamma correction on the digital signal received from the A/D converter 230, carrying out processing concerning color separation, color difference matrix, and the like, on the gamma-corrected signal, then adding a synchronization signal to the signal, to thereby generate a standard television signal. The DSP 240 receives a processing command from a microcomputer 270 that controls the overall operation of the image pickup apparatus. Image data processed by the DSP 240 is stored in a memory 250, while image information e.g. on picked-up still images and moving images is recorded in a recording medium 260, such as a memory card. It should be noted that in FIG. 7, reference numeral 280 designates a liquid crystal panel, and reference numeral 290 designates a moving-image/still-image changeover switch.

Next, a description will be given of a method of controlling the diaphragm mechanism 120 and the ND filter 160.

First, light incident from the lens 110 passes through the aperture of the diaphragm mechanism 120 and the ND filter 160, and light limited by the ND filter 160 enters the CCD sensor 200. A signal photoelectrically converted by the CCD sensor 200 is converted to a digital signal by the CDS/AGC 220 and the A/D converter 230, and is subjected to camera signal processing by the DSP 240. The DSP 240 outputs luminance data to the microcomputer 270 according to a corresponding range for exposure control, and the microcomputer 270 performs computation for the exposure control based on the luminance data. If it is determined based on the result of the computation that proper exposure is not obtained, the diaphragm mechanism 120, the ND filter 160, the electronic shutter function of the CCD sensor 200, and the AGC of the CDS/AGC 220 are controlled such that proper exposure can be obtained.

Out of control devices related to the above four control parameters for exposure control, the diaphragm mechanism 120 and the ND filter 160 will be described with reference to FIG. 8.

First, at (A) in FIG. 8, the aperture of the diaphragm mechanism 120 is opened, and the ND filter 160 is fully retracted from the aperture of the diaphragm mechanism 120. From this state, exposure is controlled in a direction reducing the amount of light incident on the CCD sensor 200. More specifically, as shown at (B) in FIG. 8, when the diaphragm mechanism 120 is stopped down to a certain aperture diameter (F4.0), the aperture diameter of the diaphragm mechanism 120 is fixed, whereafter the ND filter 160 is continuously and progressively inserted into the aperture for control of the exposure. It should be noted that "the ND filter is inserted into the aperture" is intended to mean "the ND filter is inserted into an optical path immediately after or immediately before the aperture (in the present example, "immediately after the aperture") which has the same diameter as that of the aperture, to be exact, and "the ND filter is retracted from the aperture" is intended to mean "the ND filter is retracted from the optical path immediately after or immediately before the aperture (in the present example, "immediately after the aperture"), to be exact. This applies to the description and also to the claims.

At this time, as shown at (C) in FIG. 8, the ND filter 160 is sometimes inserted halfway into the aperture of the diaphragm mechanism 120, and as shown at (D) and (E) in FIG. 8, there sometimes occurs a case where different density areas of the ND filter 160 cover the aperture of the diaphragm mechanism 120 at the same time.

In such cases, as shown in FIG. 10, diffraction of light is caused by a thickness step or a density step existing in the ND filter 160, which results in the degraded resolution of images.

In general, compared with moving image shooting which gives priority to the smoothness of an image, still image shooting gives a top priority to the resolution of an image, and therefore it is preferable to avoid insertion of the ND filter 160 into the aperture of the diaphragm mechanism 120 in such an incomplete fashion as causes a thickness step or a density step to exist in the ND filter 160. To this end, if the use of the ND filter 160 for still image shooting is inhibited, compared with the moving image shooting, the dynamic range of exposure control is reduced by a degree corresponding to the density of the ND filter 160.

To overcome this inconvenience, the following technique has been proposed (see Japanese Laid-Open Patent Publication (Kokai) No. 2004-72580).

According to the proposed technique, in the still image shooting mode, as shown in FIG. 9, the aperture of the diaphragm mechanism 120 is more closed as an object becomes brighter, and the control of the diaphragm mechanism 120 is stopped at an aperture diameter corresponding to an F number of F11. Subsequently, the closing operation of the ND filter 160 is controlled such that the whole aperture diameter of the diaphragm mechanism 120 is covered with the ND filter 160. At this time, the aperture diameter of the diaphragm mechanism 120 is increased to a value corresponding to an F number of F4 to correct light shielded by the ND filter 160 according to the density of the ND filter 160.

Further, a degree of exposure or an amount of light which cannot be corrected by the increase in the aperture diameter is corrected by decreasing the speed of the electronic shutter, in other words, by increasing a time period over which light is stored in the CCD sensor 200. By the correction control, it is possible to make inconspicuous a sudden change in the amount of light, caused by the insertion of the ND filter 160 into the aperture of the diaphragm mechanism 120.

After that, if the brightness of the object further increases, the exposure is controlled by increasing the electronic shutter speed from 1/60 sec. to 1/250 sec., and decreasing the aperture diameter of the diaphragm mechanism 120 from a value corresponding to a F number of F4 to a value corresponding to a F number of F11.

Inversely, exposure control from a state in which the ND filter 160 is fully inserted into the aperture of the diaphragm mechanism 120 to a state in which the ND filter 160 is fully retracted from the opening is performed in a direction in which the object becomes darker, opposite to the direction in which the object becomes brighter, as described above.

More specifically, in the state in which the ND filter 160 is fully inserted into the aperture of the diaphragm mechanism 120, the electronic shutter speed is set to 1/60 sec. and the aperture diameter of the diaphragm mechanism 120 is set to a value corresponding to an F number of F4. Further, if the microcomputer 270 determines that the object has become darker, the electronic shutter speed is set to 1/250 sec. with the aperture diameter of the diaphragm mechanism 120 being set to a value corresponding to an F number of F11, and the ND filter 160 is fully retracted from the aperture of the diaphragm mechanism 120. After that, if the object becomes still darker, the exposure is controlled by the electronic shutter speed and the diaphragm mechanism 120.

As described hereinabove, the ND filter 160 is not continuously inserted into the aperture of the diaphragm mechanism 120, but exposure control is carried out such that the ND filter 160 is fully inserted into or retracted from the aperture of the diaphragm mechanism 120, whereby it is possible to prevent light diffraction from being caused by the density step or the thickness step in the ND filter 160. This makes it possible to prevent degradation of the resolution of images during still image shooting, to secure the dynamic range of exposure control using the ND filter 160 both for still image shooting and for moving image shooting.

However, in the aforementioned Japanese Laid-Open Patent Publication (Kokai) No. 2004-72580, the ND filter 160 is caused to perform an opening or closing operation suddenly on the aperture of the diaphragm mechanism 120, and therefore there exists a luminance shock (sudden change in luminance) on the screen, though for a moment. The luminance shock not only degrades image quality but also becomes a cause of missing a perfect moment to pick up an image. More specifically, when a user is about to pick up a still image, if the ND filter 160 is suddenly and automatically inserted into or retracted from the aperture of the diaphragm mechanism 120, there is a large change in luminance, which can cause the user to hesitate to depress the shutter button to pick up the image.

Although the luminance shock does not actually damage the result of still image shooting insofar as it occurs on a monitor screen used during still image shooting, if the luminance shock occurs during moving image shooting, continuity of luminance is lost.

SUMMARY OF THE INVENTION

The present invention provides an image pickup apparatus which is capable of preventing light diffraction from being caused by a density step or a thickness step in a filter, thereby preventing degradation of resolution during still image shooting, and securing the dynamic range of exposure control during both moving image shooting and still image shooting. Further, the present invention provides an image pickup apparatus which is capable of suppressing a luminance shock on a screen, thereby ensuring the continuity of luminance.

The present invention provides an image pickup apparatus comprising an image pickup element adapted to convert light incident thereon from a lens into an electric signal, a diaphragm mechanism adapted to change an amount of light incident on the image pickup element, a filter adapted to cover an aperture of the diaphragm mechanism such that the aperture can be opened and closed, thereby adjusting the amount of light incident on the image pickup element after passing through the aperture, the filter having a transparent portion for selectively opening and closing the aperture of the diaphragm mechanism, and a density gradation portion, and a controller adapted to control a closing operation of the filter for closing the aperture, such that the closing operation is performed at different speeds between when the gradation portion covers the aperture of the diaphragm mechanism and when the transparent portion covers the aperture of the diaphragm mechanism.

With the arrangement of the image pickup apparatus of the present invention, it is possible to suppress the density step using the transparent portion of the filter, and suppress the thickness step and the density step using the density gradation portion of the filter. This makes it possible to prevent light diffraction from being caused by the density step and the thickness step in the filter, thereby preventing degradation of resolution during still image shooting, and securing the dynamic range of exposure control using the filter both for still image shooting and for moving image shooting Further, it is possible to suppress a luminance shock using the transparent portion of the filter, thereby making it possible to ensure the continuity of luminance not only in a still image but also in a moving image.

The controller can be adapted to control the closing operation of the filter such that the closing operation is performed at a higher speed when the transparent portion covers the aperture of the diaphragm mechanism than when the gradation portion covers the aperture of the diaphragm mechanism.

The controller can be adapted to control an opening operation of the filter for opening the aperture, such that the opening operation is performed at a higher speed when the transparent portion is retracted from the aperture of the diaphragm mechanism than when the gradation portion is retracted from the aperture of the diaphragm mechanism.

A speed at which the closing operation of the filter is performed when the gradation portion covers the aperture of the diaphragm mechanism can be equivalent to a speed at which a light amount is changed by the diaphragm mechanism.

The controller can be adapted to cause the filter to perform the closing operation such that the transparent portion covers a whole area of the aperture of the diaphragm mechanism, when the filter shifts from a state in which the filter is retracted from the aperture to a state in which the filter covers the aperture.

The controller can be adapted to cause the filter to perform an opening operation for opening the aperture of the diaphragm mechanism such that the filter is retracted from the aperture from the state in which the transparent portion covers the whole area of the opening.

The controller can be adapted to control the aperture of the diaphragm mechanism such that a size of the aperture becomes equal to or smaller than that of the transparent portion, when the filter shifts from a state in which the filter is retracted from the aperture to a state in which the filter covers the aperture.

The controller can be adapted to control the aperture of the diaphragm mechanism such that a size of the aperture becomes equal to or smaller than that of the transparent portion, when the filter shifts from a state in which only the transparent portion of the filter covers the aperture to a state in which the filter is retracted from the aperture.

The controller can be adapted to cause the filter to perform the closing operation such that the transparent portion covers the aperture during a blanking period of vertical scanning, when the filter shifts from a state in which the filter is retracted from the aperture to a state in which the filter covers the aperture.

The controller can be adapted to cause the filter to perform an opening operation for opening the aperture of the diaphragm mechanism such that the filter is retracted from the aperture during a blanking period of vertical scanning, when the filter shifts from a state in which only the transparent portion of the filter covers the aperture to a state in which the filter is retracted from the aperture.

The image pickup apparatus can comprise a luminance value-generating unit adapted convert the electric signal output from the image pickup element to a luminance value, and when the filter shifts from a state in which the filter is retracted from the aperture of the diaphragm mechanism to a state in which the filter covers the aperture, the controller can be adapted to cause the filter to perform the closing operation such that the transparent portion covers the aperture, when the luminance value generated by the luminance value-generating unit becomes different from a preset luminance target value by a predetermined level.

When the filter shifts from a state in which only the transparent portion of the filter covers the aperture of the diaphragm mechanism to a state in which the filter is retracted from the aperture, the controller can be adapted to cause the filter to perform an opening operation for opening the aperture of the diaphragm mechanism such that the filter is retracted from the aperture, when the luminance value generated by the luminance value-generating unit becomes different from a preset luminance target value by a predetermined level.

The image pickup apparatus can comprise a luminance value-generating unit for converting the electric signal output from the image pickup element to a luminance value, and when the filter shifts from a state in which only the transparent portion of the filter covers the aperture of the diaphragm mechanism to a state in which the filter is retracted from the aperture, the controller can be adapted to cause the filter to perform an opening operation for opening the aperture of the diaphragm mechanism such that the filter is retracted from the aperture, when the luminance value generated by the luminance value-generating unit becomes different from a present luminance target value by a predetermined level.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail below with reference to the accompanying drawings showing preferred embodiment thereof.

Figure 1:
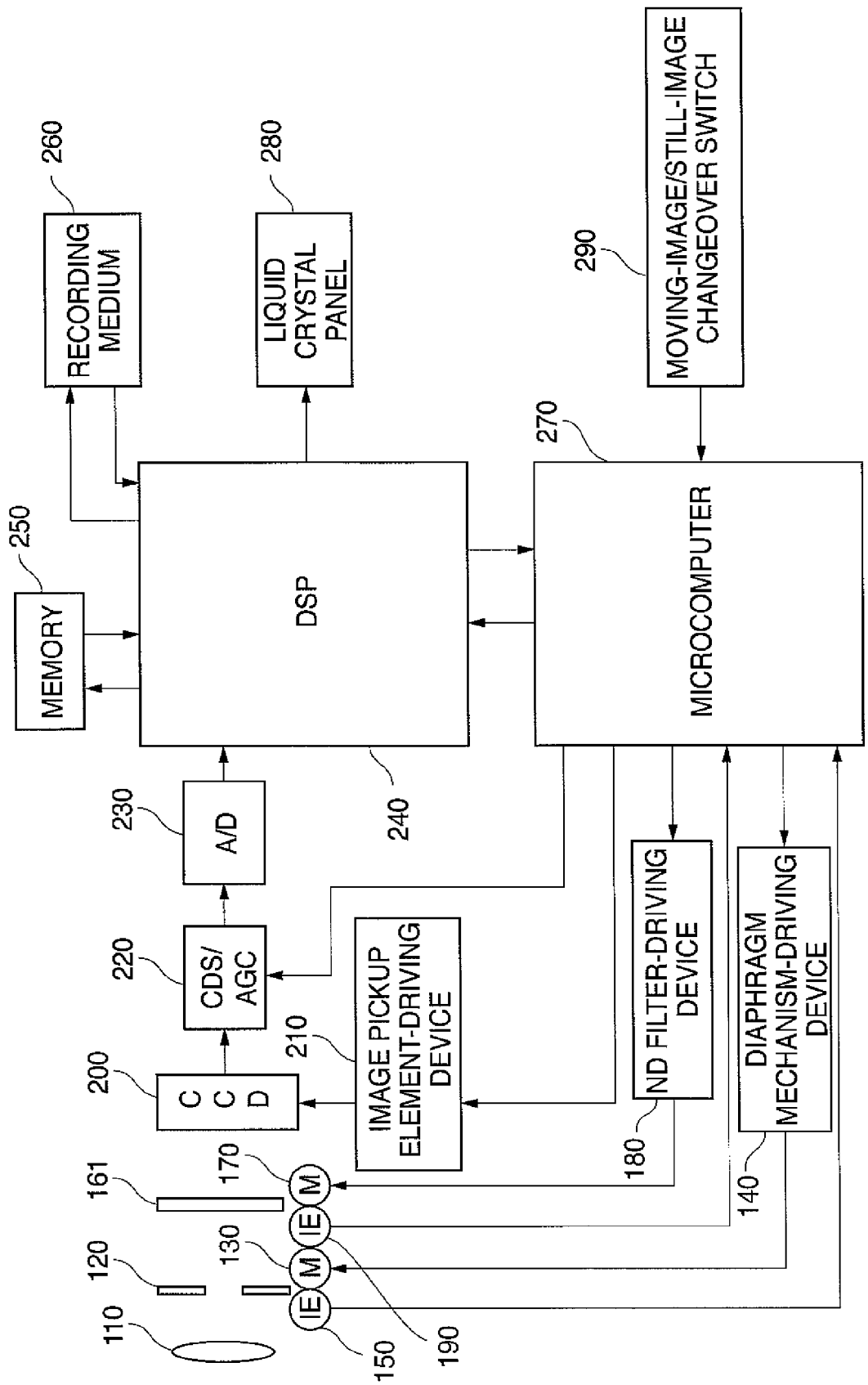
FIG. 1 is a schematic block diagram of an image pickup apparatus according to an embodiment of the present invention.
Figure 2:
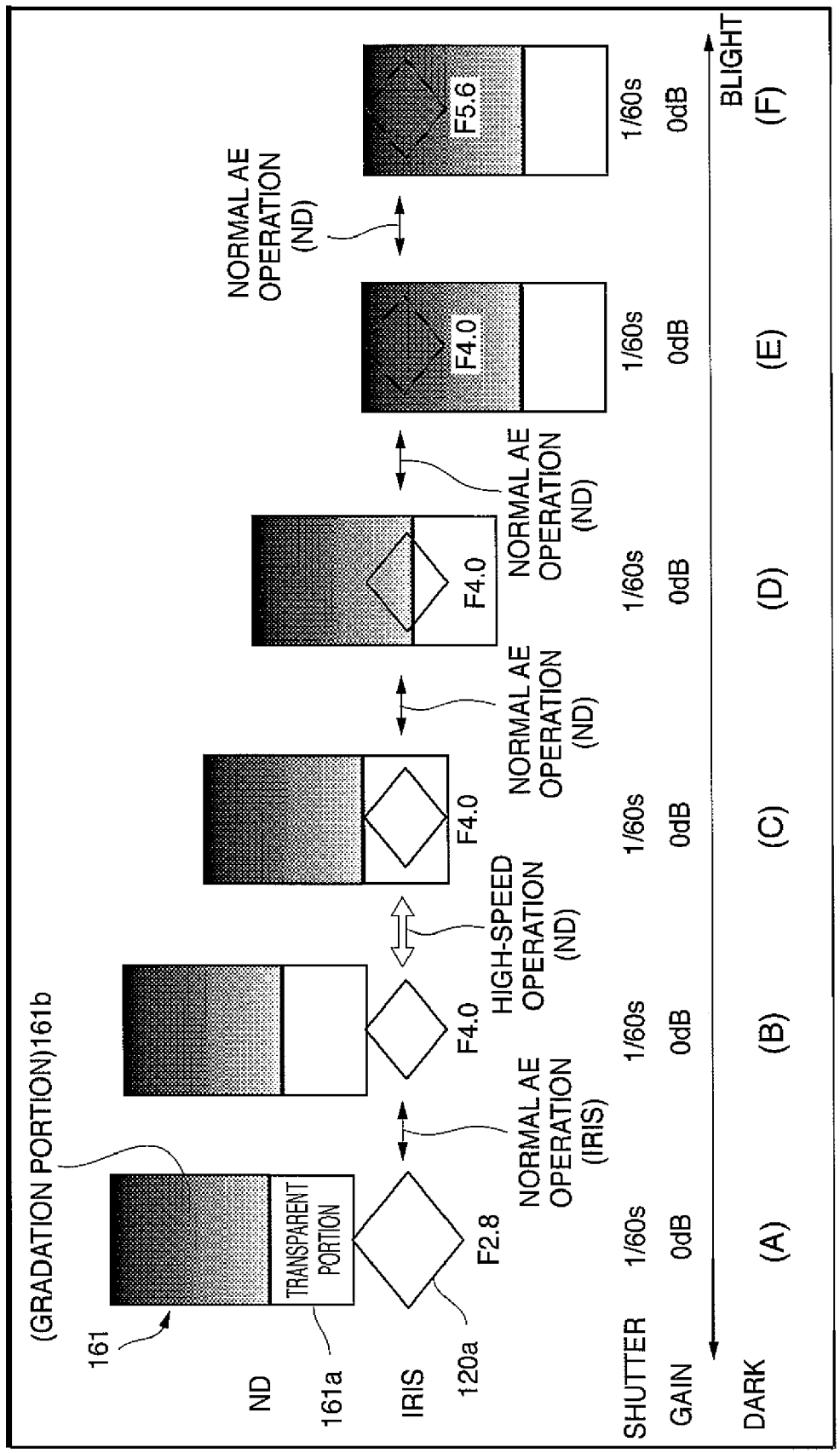
FIG. 2 is a diagram which is useful in explaining an example of a method of controlling an ND filter.
Figure 3:
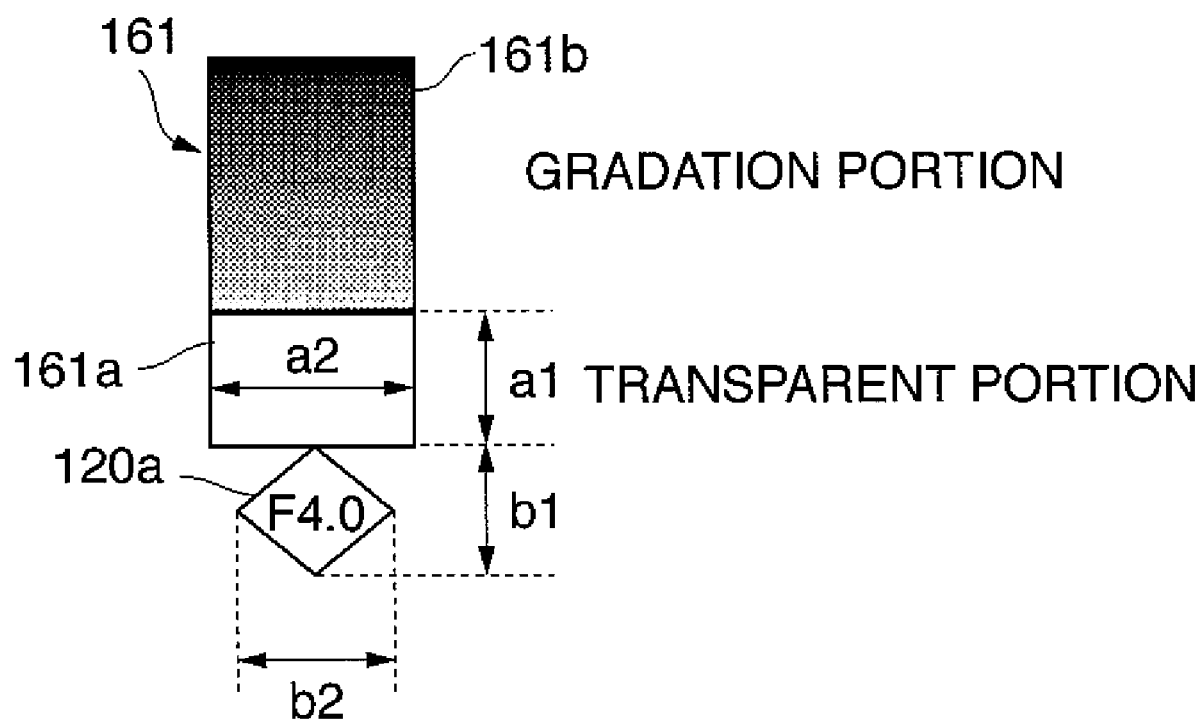
FIG. 3 is a diagram which is useful in explaining the relationship between the size of a transparent portion of the ND filter and the size of an aperture of a diaphragm mechanism.
Figure 4:
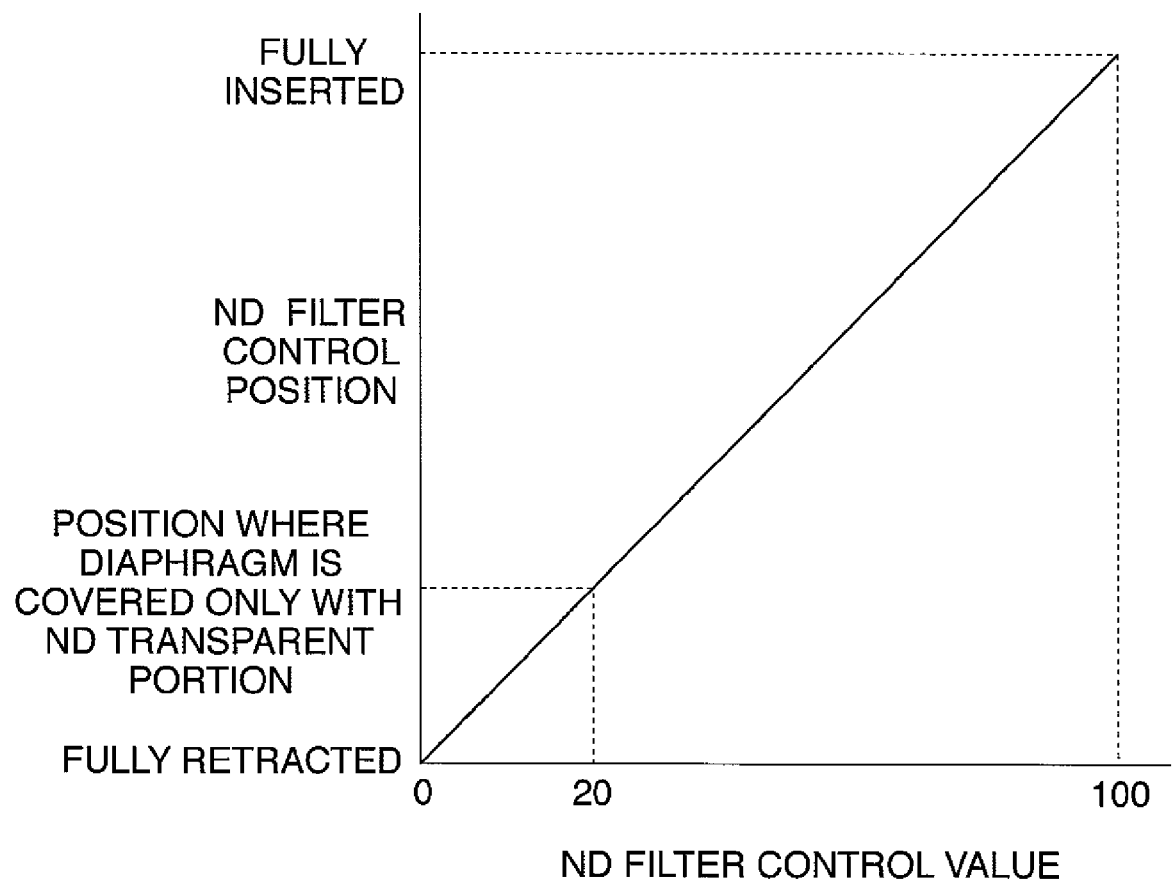
FIG. 4 is a graph showing the relationship between an ND filter control value and an ND filter control position.
Figure 5:
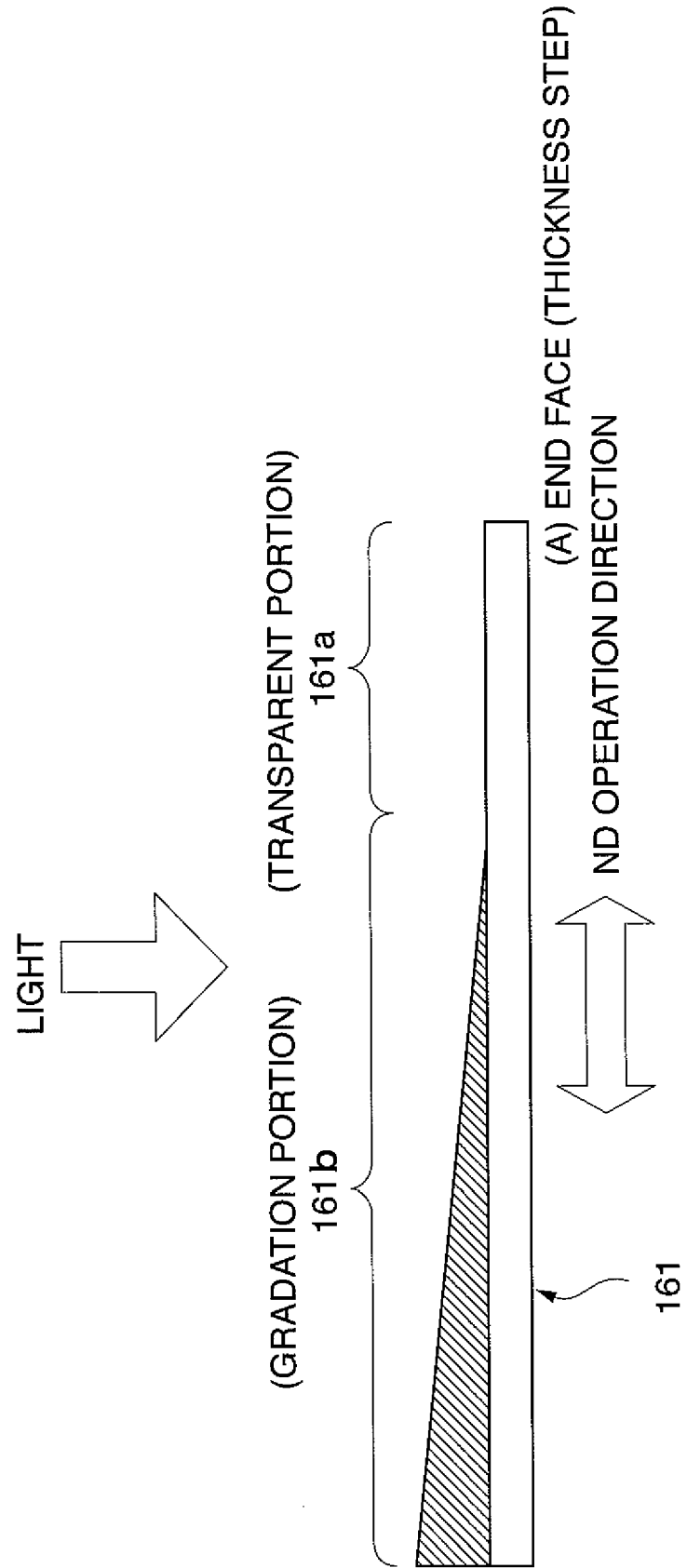
FIG. 5 is a schematic cross-sectional view of the ND filter.
Figure 6:
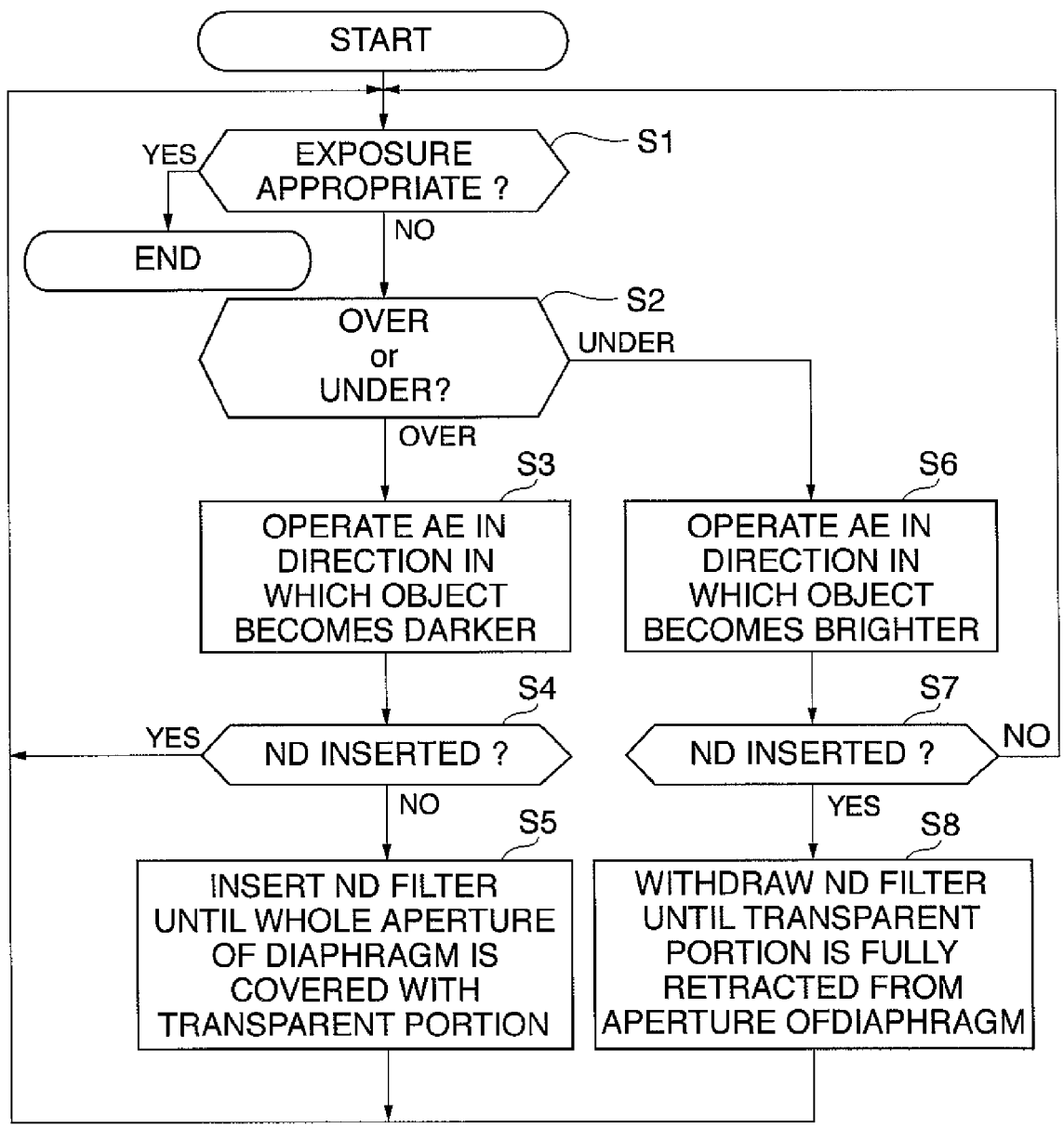
FIG. 6 is a flowchart which is useful in explaining an example of the operation of the image pickup apparatus according to the embodiment.
Figure 7:
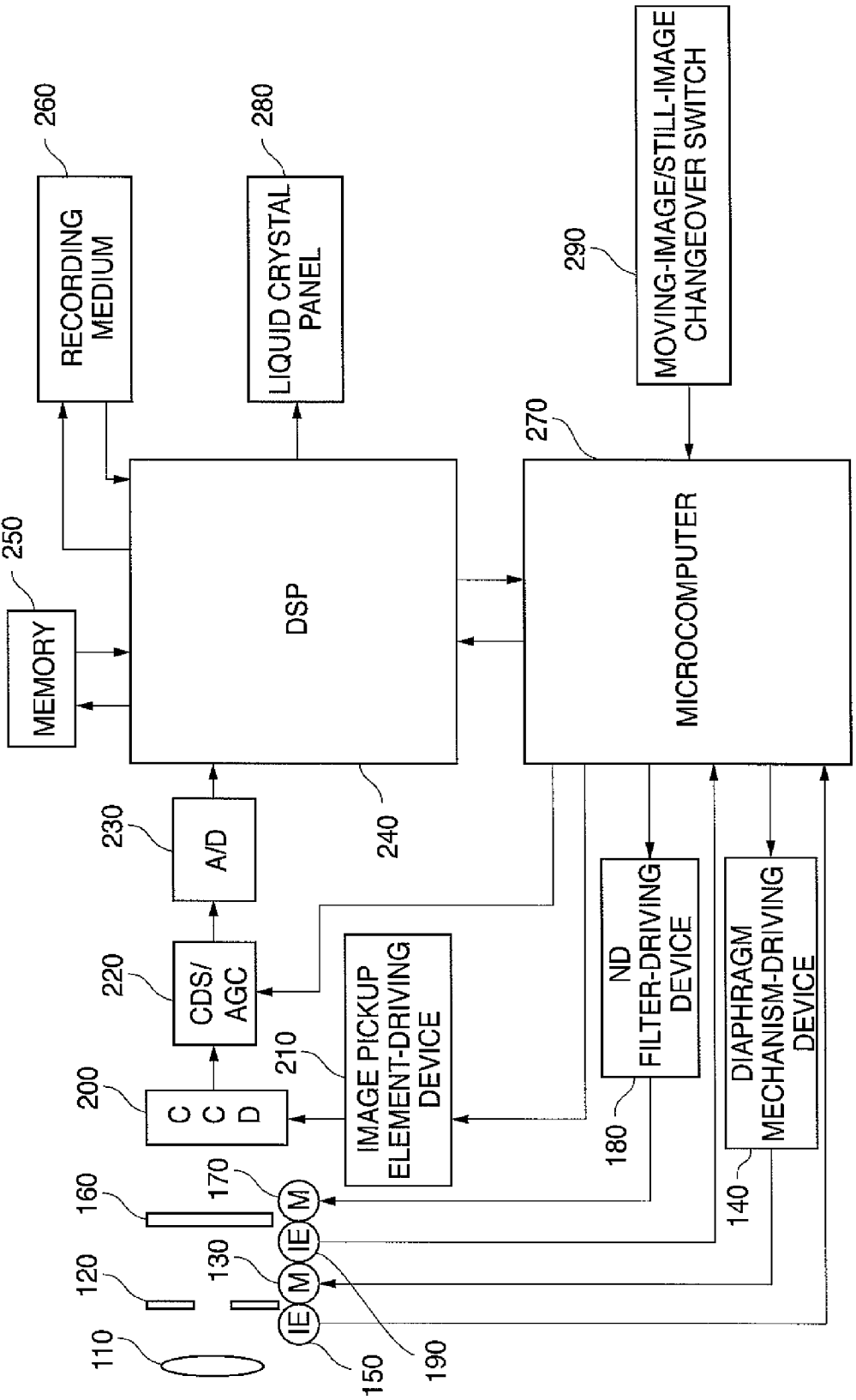
FIG. 7 is a schematic block diagram of a conventional image pickup apparatus.
Figure 8:
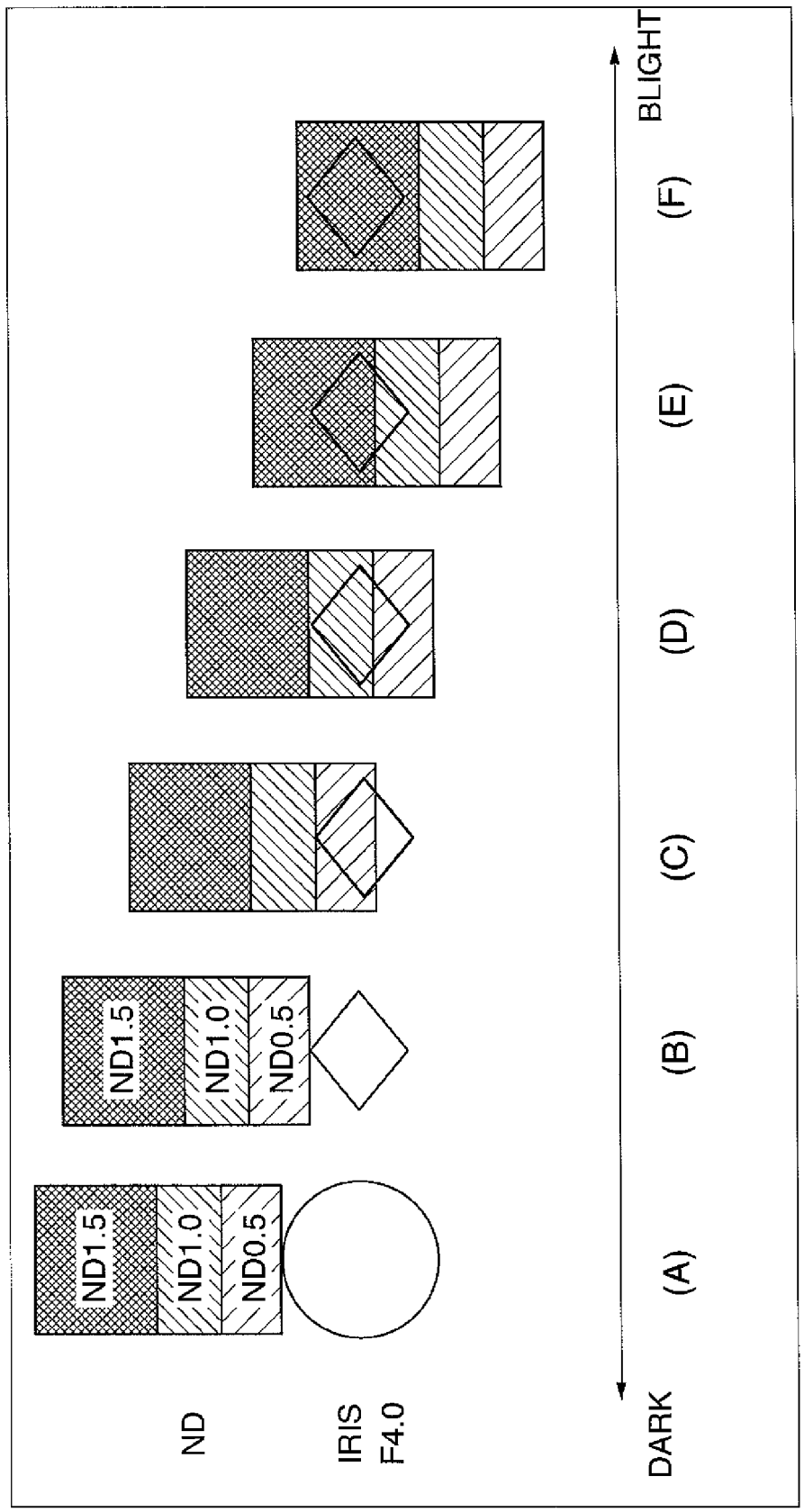
FIG. 8 is a diagram which is useful in explaining a method of controlling a conventional ND filter.
Figure 9:
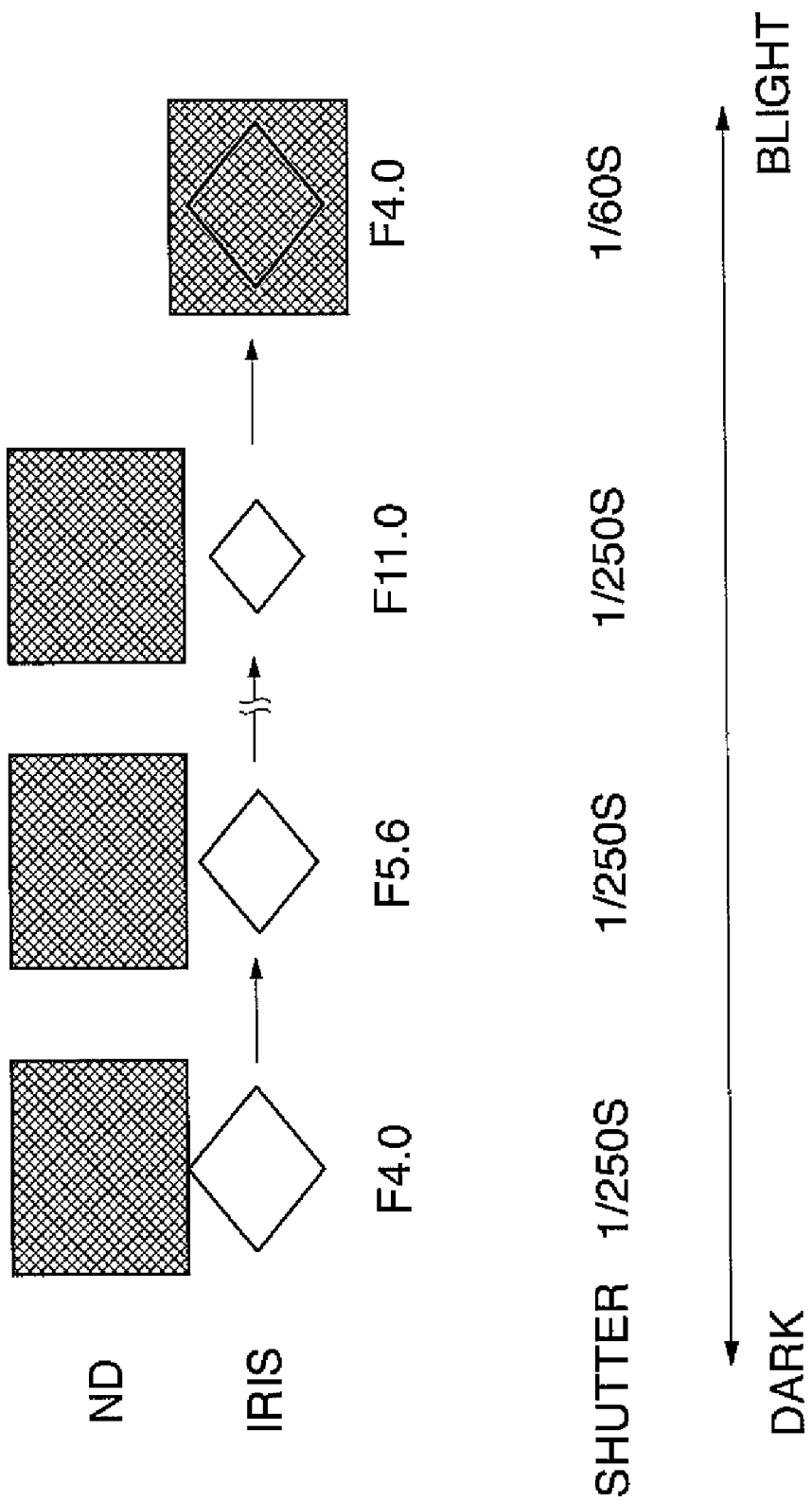
FIG. 9 is a diagram which is useful in explaining a method of controlling another conventional ND filter.
Figure 10:
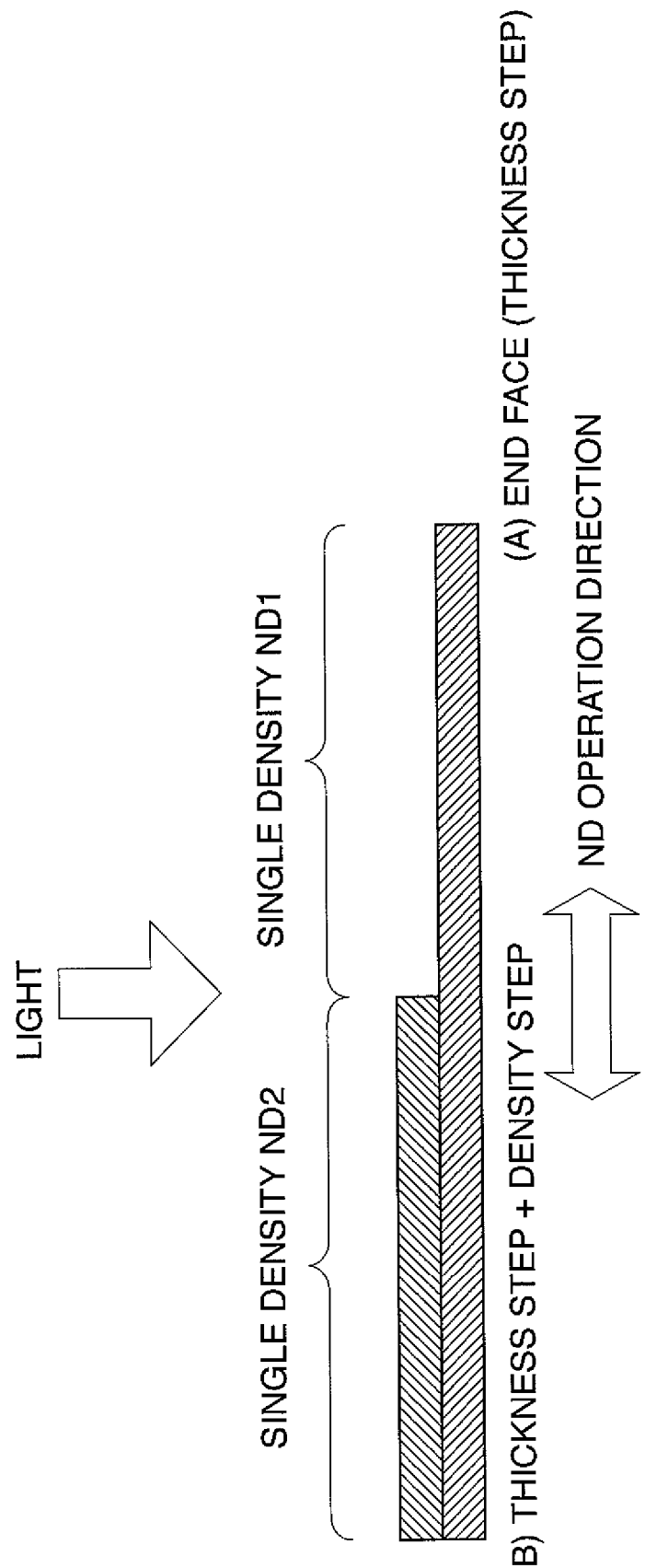
FIG. 10 is a schematic cross-sectional view of the conventional ND filter.

FIG. 1 is a schematic block diagram of an image pickup apparatus according to an embodiment of the present invention. FIG. 2 is a diagram which is useful in explaining an example of a method of controlling an ND filter. FIG. 3 is a diagram which is useful in explaining the relationship between the size of a transparent portion of the ND filter and the size of an aperture of a diaphragm mechanism of the ND filter. FIG. 4 is a graph showing the relationship between an ND filter control value and an ND filter control position. FIG. 5 is a schematic cross-sectional view of the ND filter. FIG. 6 is a flowchart which is useful in explaining an example of the operation of the image pickup apparatus according to the embodiment. It should be noted that in the present embodiment, for the basic construction of the image pickup apparatus, the conventional image pickup apparatus already described with reference to FIG. 7 is referred to, by way of example, and the following description will be given only of different points of the embodiment therefrom, while designating component parts identical to those of the conventional image pickup apparatus by identical reference numerals, and omitting duplicate description thereof.

Referring to FIG. 1, in the image pickup apparatus according to the embodiment, the ND filter 161 is disposed between the diaphragm mechanism 120 and a CCD sensor (image pickup element) 200, for limiting the amount of light incident on the CCD sensor 200 from the diaphragm mechanism 120.

As shown in FIG. 2, the ND filter 161 includes a transparent portion 161a for selectively opening and closing an aperture 120a of the diaphragm mechanism 120, and a density gradation portion 161b. The gradation portion 161b is formed such that as the distance of a portion from the transparent portion 161a increases, the density of the portion progressively increases.

First, a description will be given of four parameters for exposure control, i.e. the F number of the diaphragm mechanism 120, the density of the ND filter 161 dependent on the control position thereof, a shutter speed, and a gain.

When one of the four parameters is changed, the other three parameters are fixed. Further, which parameter is to be changed at which brightness is determined depending on the mode of AE (Automatic Exposure). The AE for performing the above operations is called a program AE.

In the present embodiment, it is assumed that the mode of the program AE is an automatic mode. Table data shown in FIG. 1 is stored in a predetermined storage area (ROM or the like) of a microcomputer 270, and the microcomputer 270 determines the control value of each operation parameter of the program AE, thereby controlling the parameter.

equal to F4.0, the brightness level of the object shifts to "Mid" as shown in Table 1. During this level, the microcomputer 270 performs exposure control using the ND filter 161, i.e. controls the opening/closing operation of the ND filter 161 on the aperture 120a of the diaphragm mechanism 120. The other parameters are controlled such that the F number determining the aperture diameter of the diaphragm mechanism 120 is fixed to F4.0, the shutter speed to 1/60 sec., and the gain to 0 dB. It should be noted that although a description of the brightness levels of "Dark 1" and "Dark 2" is omitted, the program AE operates similarly to the above.

Next, a description will be given of exposure control performed when the brightness level in Table 1 is "Mid", which is an essential part of the present invention.

In this exposure control, the closing operation of the ND filter 161 is controlled which is performed when the ND filter 161 shifts from a state in which it is fully retracted from the aperture 120a of the diaphragm mechanism 120 to a state in which it covers the whole area of the aperture 120a. Further, inversely, the opening operation of the ND filter 161 is controlled which is performed when the ND filter 161 shifts from the state in which it covers the whole area of the aperture 120a to the state in which it is fully retracted from the aperture 120a.

FIG. 2 schematically shows changes in the respective parameters of the program AE between the brightness levels "Dark 1" and "Mid" in Table 1.

In FIG. 2, (A) corresponds to the lowest level of brightness of an object, and (B) to (F) rightward of (A) correspond to respective levels of brightness of the object which increase

TABLE 1

| | BRIGHTNESS | | | | |
|---|---|---|---|---|---|
| | Dark 2 | Dark 1 | Mid | Blight 1 | Blight 2 |
| F NUMBER (DIAPHRAGM) | F1.6 | F1.6 ⇔ F4.0 | F4, 0 | F4.0 ⇔ F8.0 | F8.0 |
| ND | FULLY RETRACTED | FULLY RETRACTED | FULLY RETRACTED ⇔ FULLY INSERTED | FULLY INSERTED | FULLY INSERTED |
| SHUTTER SPEED | 1/60 | 1/60 | 1/60 | 1/60 | 1/60 ⇔ 1/500 |
| GAIN | 18 dB ⇔ 0 dB | 0 dB | 0 dB | 0 dB | 0 dB |

In Table 1, when an object is at a brightness level of Blight 2, the four parameters are set as follows: an F number of F8.0, the ND filter 161 in a position fully inserted (state covering the whole area of the aperture of the diaphragm mechanism), a shutter speed of 1/500 sec. to 1/60 sec., and a gain of 0 db. This means that the shutter speed is changed between 1/500 sec. and 1/60 sec. while controlling the other parameters such that they are fixed to the states shown in the Table 1 to thereby control exposure.

From this state, let it be assumed that the object starts to become darker. When the shutter speed is reduced to 1/60 sec., the brightness level of the object shifts to "Blight 1", as shown in Table 1. During this level, the microcomputer 270 performs exposure control using the diaphragm mechanism 120 such that the F number indicative of the aperture diameter of the diaphragm mechanism is controlled from F8.0 toward F4.0. The other parameters are controlled such that the ND filter 161 remains in the fully inserted state, and the shutter speed and the gain are fixed to 1/60 sec. and 0 dB, respectively.

From the above state, when the F number indicative of the aperture diameter of the diaphragm mechanism 120 becomes from left to right, as viewed in FIG. 2. Further, FIG. 2 shows an F number indicative of the aperture diameter of the diaphragm mechanism 120, a control position of the ND filter 161, an electronic shutter speed, a gain value, which are determined to be appropriate at each of the brightness levels. When a comparison is made with Table 1, (B) to (E) in FIG. 2 correspond to the brightness level "Mid" in Table 1.

Referring first to (A) in FIG. 2, there are shown a state (corresponding to "Dark 1" in Table 1) in which the F number indicative of the aperture diameter of the diaphragm mechanism 120 is F2.8; the ND filter 161 is fully retracted (state in which the ND filter is fully retracted from the aperture 120a of the diaphragm mechanism 120); the shutter speed is 1/60 sec.; and the gain is 0 dB.

Now, in the state of (A) in FIG. 2, since the aperture 120a of the diaphragm mechanism 120 has a larger width than that of the ND filter 161, it is impossible to cause the ND filter 161 to perform a closing operation to cover the whole area of the aperture 120a with the transparent portion 161a of the ND filter. Assuming that the ND filter 161 is caused to perform the closing operation, three faces, i.e. an end face and side faces of the transparent portion 161a of the ND filter extend in the aperture 120a of the diaphragm mechanism 120, which results in an image largely degraded by thickness steps. Therefore, in the state of (A) in FIG. 2, the diaphragm mechanism 120 is controlled without performing the control of the closing operation of the ND filter 161 to cover the whole area of the aperture 120a with the transparent portion 161a of the ND filter.

During the control of the diaphragm mechanism 120, when the amount of light incident on the CCD sensor 200 increases as the object becomes brighter, the microcomputer 270 controls the aperture 120a of the diaphragm mechanism 120 in the direction of closing (stopping down, i.e. narrowing) the aperture 120a so as to reduce the amount of the incident light. At this time, the stopping-down operation is continuously performed to provide a smooth change in the luminance of the object (normal AE operation).

Then, when it is determined that the F number of the aperture diameter of the diaphragm mechanism 120 is adjusted to F4.0, the control of the diaphragm mechanism 120 is stopped by the microcomputer 270, and the control process proceeds from the control operation at (A) to a control operation at (B), wherein the control of the opening/closing operation of the ND filter 161 is performed. The control of the diaphragm mechanism 120 is stopped in the above timing because the aperture 120a of the diaphragm mechanism 120 has been narrowed enough to have its whole area covered with the transparent portion 161a of the ND filter 161.

FIG. 3 shows the relationship between the size of the transparent portion 161a of the ND filter 161 and the size of the aperture 120a of the diaphragm mechanism in the state of (B) in FIG. 2. As is clearly illustrated in FIG. 3, in the state of (B) in FIG. 2, both a1>b1 and a2>b2 hold at the same time, which means that the aperture 120a of the diaphragm mechanism 120 has been narrowed enough to have its whole area covered with the transparent portion 161a of the ND filter 161.

Subsequently, the control process proceeds from the control operation at (B) to a control operation at (C) in FIG. 2, wherein the closing operation of the ND filter 161 is controlled such that the whole area of the aperture 120a (F4.0) of the diaphragm mechanism 120 is covered with the transparent portion 161a of the ND filter 161. The closing operation by the transparent portion 161a is controlled to be performed at a high speed which is higher than the speed of the closing operation by the gradation portion 161b, described hereinafter in a description of the control operations at (C) and (D) in FIG. 2. It should be noted that the term "high speed" is intended here to mean a high speed which causes a smooth change in the luminance of the object without causing the user to feel any sense of oddness, and in the present embodiment, the ND filter 161 is operated at a speed corresponding to 2 V to 3 V (1 V=1/60 sec.).

Further, the ND filter 161 is operated at the high speed because a change in the refractive index occurs when light passes astride between an area with the filter and an area without the filter.

To realize the high-speed operation as described above, it is determined in advance such that the ND filter 161 is caused to perform the opening/closing operation when the F number is a predetermined value (F4.0 in the present embodiment). Then, the control position (ND filter control position) of the ND filter 161 for covering the whole area of the aperture 120a of the diaphragm mechanism 120 with the transparent portion 161a of the ND filter 161 is naturally determined, and a control value (ND filter control value) for moving the ND filter 161 to the control position is also determined.

FIG. 4 shows the relationship between the ND filter control position and the ND filter control value.

As shown in FIG. 4, the control positions of the ND filter and the control values thereof are in a linear relationship in which they are in one-to-one correspondence with each other. When the ND filter control value is equal to 0, the ND filter control position is where the ND filter 161 is fully retracted from the aperture 120a of the diaphragm mechanism 120. Further, when the ND filter control value is equal to 100, the ND filter control position is where the ND filter 161 covers the whole area of the aperture 120a of the diaphragm mechanism 120, and at the same time a terminating position where the closing operation of the ND filter 161 is terminated (fully inserted position).

Now, the ND filter control value for covering the whole area of the aperture 120a of the diaphragm mechanism 120 only with the transparent portion 161a of the ND filter 161 is equal to 20, and hence the ND filter control value of 20 is stored in advance in the microcomputer 270. Then, when the aperture 120a of the diaphragm mechanism 120 is desired to be covered with the transparent portion 161a of the ND filter 161, the ND filter control value is changed from 0 to 20 in one stroke. This causes the ND filter 161 to perform the closing operation at the high speed, whereby the whole area of the aperture 120a of the diaphragm mechanism 120 is covered at a speed corresponding to 2 V to 3 V ((C) in FIG. 2). Inversely, when the ND filter 161 is to be retracted from the aperture 120a of the diaphragm mechanism 120, similarly, the ND filter control value is changed from 20 to 0 in one stroke.

It takes 2 V to 3 V to cover the whole area of the aperture 120a because the change in exposure by the ND filter 161 is feedback-controlled. This is due to the characteristic of a feedback loop. Although the operation is called the high-speed operation, since it takes 2 V to 3 V to be done, there is a fear that an image is picked up at a moment in which an end face of the ND filter 161 is passing on the aperture 120a of the diaphragm mechanism 120.

More specifically, when a strong light hits the end face of the ND filter 161, the light reflected on the end face hits the CCD sensor 200 to be picked up as a reflection ghost. This can result in a degraded image. Therefore, it is important to shorten a time period taken to perform the opening/closing operation of the ND filter 161.

To this end, in the present embodiment, generation of a reflection ghost is prevented by the following method as a preferred example.

First, it is assumed that the opening/closing operation of the ND filter 161 is controlled by a control system without a feedback loop. The control system is capable of performing a high-speed operation, and if the closing operation of the ND filter 161 from (B) to (C) in FIG. 2 is performed at high speed during the blanking period of vertical scanning, an image is no longer picked up at a moment in which the end face of the ND filter 161 is passing on the aperture 120a of the diaphragm mechanism 120. This makes it possible to prevent a reflection ghost from being generated by strong light reflected on the end face of the ND filter 161. Here, the term "blanking period" is intended to mean a blank time period from termination of scanning of an image to a time point before the start of scanning of the next image.

Further, when the ND filter 161 is caused to perform the opening/closing operation at high speed, the problem of hunting of the exposure control can be brought about.

More specifically, the aperture 120a of the diaphragm mechanism 120 is covered with the transparent portion 161a of the ND filter 161, and the transparent portion 11a has a limited transmittance (97%). Therefore, although almost no change in luminance can be visually recognized, a luminance value calculated by the DSP 240 for evaluating the exposure is changed (cut) by 3% of the luminance value of incident light on the ND filter 161. As a result, when an appropriate luminance value for the exposure exists in the vicinity of the high-speed operation of the ND filter 161, the opening/closing operation of the ND filter 161 is repeatedly carried out, causing the hunting of the exposure control. When the change in the luminance by 3% of the value thereof is repeated, the change becomes conspicuous enough for the user to notice by the eye. Further, since the ND filter 161 is caused to perform the high-speed operation repeatedly, power consumption becomes larger.

To solve the above problem, in the present embodiment, the hunting of the exposure control is prevented by the following method as a preferred example.

First, the current luminance value calculated by the DSP 240 is represented by Y, and a luminance value obtained when the exposure is appropriate is represented by Y0. The following equation (1) is considered as a condition for covering the aperture 120a with the ND filter 161 by causing the ND filter 161 to perform the closing operation at high speed from the state in which the ND filter 161 is fully retracted from the aperture 120a of the diaphragm mechanism 120.

$$Y - Y0 > \text{luminance change value of 3\%} (Y1) \quad (1)$$

More specifically, for the exposure control, the luminance change value Y1 corresponding to 3% of the luminance value of incident light on the ND filter 161 provides a hysteresis, and when the luminance value of an object whose image is picked-up becomes equal to the luminance value Y satisfying the condition expressed by the equation (1), the ND filter 161 is caused to perform the closing operation at high speed.

Further, the following equation (2) is considered as a condition for retracting the ND filter 161 from the aperture 120a by causing the ND filter 161 to perform the opening operation at high speed from the state in which the ND filter 161 covers the aperture 120a of the diaphragm mechanism 120.

$$Y0 - Y > \text{luminance change value of 3\%} (Y1) \quad (2)$$

More specifically, for the exposure control, the luminance change value Y1 corresponding to 3% of the luminance value of incident light on the ND filter 161 provides a hysteresis, and when the luminance value of an object whose image is picked-up becomes equal to the luminance value Y satisfying the condition expressed by the equation (2), the ND filter 161 is caused to perform the opening operation at high speed.

By carrying out the above-described hysteresis control, it is possible to prevent the ND filter 161 from being repeatedly inserted into or retracted from the aperture 120a at high speed, thereby making it possible to prevent the hunting of the exposure control.

As described above, the end face of the ND filter 161 is caused to pass on the aperture diameter of the diaphragm in a very brief moment by the high-speed operation of the ND filter 161 from (B) to (C) in FIG. 2. Therefore, it is possible to prevent light diffraction from being caused by a thickness step of the ND filter 161. Further, it is possible to suppress the density step by the transparent portion 161a of the ND filter 161.

After that, the closing operation of the ND filter 161 proceeds while holding the F number of the aperture diameter of the diaphragm mechanism 120 at F4.0, and as shown at (D) in FIG. 2, the aperture 120a of the diaphragm mechanism 120 is covered with both the transparent portion 161a and the gradation portion 161b of the ND filter 161. At this time, the closing operation of the ND filter 161 is continuously performed at a speed (e.g. a speed equivalent to a speed at which the light amount is changed by the diaphragm mechanism 120) slower than that of the closing operation from (B) to (C) in FIG. 2, whereby the change in the luminance of the object (normal AE operation) is made smooth. Further, as shown in FIG. 5, at a boundary between the transparent portion 161a and the gradation portion 161b of the ND filter 161, there is neither a step in the filter density nor a step in the thickness of the structure of the ND filter 161, and therefore no light diffraction is caused by the density step or the thickness step. This makes it possible to continue to pick up images excellent in resolution.

Furthermore, as shown at (E) in FIG. 2, when the ND filter 161 moves to the terminating position of the closing operation and hence further closing operation becomes impossible, the diaphragm mechanism 120 is controlled again to perform a stopping-down operation for narrowing the aperture 120a, as shown at (F) in FIG. 2. The stopping-down operation in this case is also continuously performed so that the change in the luminance of the object is smooth (normal AE operation).

Next, an example of the operation of the image pickup apparatus according to the present embodiment will be described with reference to FIG. 6. Processes in respective steps in FIG. 6 are executed by a CPU after a control program stored in a storage area (ROM, etc.) of the microcomputer is loaded into a RAM.

First, in a step S1, it is determined whether or not the exposure is appropriate. If the exposure is not appropriate, the process proceeds to a step S2, whereas if the exposure is appropriate, the present process is terminated.

In the step S2, the microcomputer 270 determines whether the exposure is above or below a target value. If the exposure is above the target value, the process proceeds to a step S3, whereas if the exposure is below the target value, the process proceeds to a step S6.

In the step S3, the microcomputer 270 issues a command for causing AE to operate such that an object image being picked up is made darker, followed by the process proceeding to a step S4.

In the step S4, the microcomputer 270 determines whether or not the ND filter 161 has been inserted.

If the ND filter 161 has already been inserted, the microcomputer 270 performs AE control using the other parameters for image pickup, such as the shutter speed and the F number of the diaphragm, and then returns to the step S1, wherein the microcomputer 270 determines again whether or not the exposure is appropriate.

If the ND filter 161 has not been inserted, the process proceeds to a step S5.

In the step S5, the ND filter 161 is in a state fully retracted from the aperture 120a of the diaphragm mechanism 120, and hence, as described above, the microcomputer 270 causes the ND filter 161 to perform the closing operation at high speed until it is moved to a position where the transparent portion 161a covers the whole area of the aperture 120a. It should be noted in the step S5, the aforementioned hysteresis control is carried out together with the exposure control to thereby suppress the hunting of the exposure control.

After that, to make the exposure appropriate, the AE control is performed. In the AE control in the step S5, the closing operation of the ND filter 161 is progressively performed so as to provide a smooth change in the luminance of the object. Then, the process returns to the step S8, wherein it is determined again whether or not the exposure is appropriate.

On the other hand, in the step S6, the microcomputer 270 issues a command for causing AE to operate such that the object image being picked up is made brighter, and the process proceeds to a step S7.

In the step S7, the microcomputer 270 determines whether or not the ND filter 161 has been inserted.

If the ND filter 161 has not been inserted, the microcomputer 270 performs the AE control using the parameters for image pickup, such as the shutter speed and the F number of the diaphragm, and then returns to the step S1, wherein the microcomputer 270 determines again whether or not the exposure is appropriate.

If the ND filter 161 has already been inserted, the process proceeds to a step S8.

In the step S8, the transparent portion 161*a* of the ND filter 161 is in a state covering the whole area of the aperture 120*a* of the diaphragm mechanism 120, so that as described above, the microcomputer 270 causes the ND filter 161 to perform the opening operation at high speed until it is moved to the position where the ND filter 161 is fully retracted from the aperture 120*a* of the diaphragm mechanism 120. After that, to make the exposure appropriate, the AE control is carried out. In the AE control in the step S8, control of the parameters for image pickup is progressively performed so as to provide a smooth change in the luminance of the object. It should be noted in the step S8, the aforementioned hysteresis control is carried out together with the exposure control to thereby suppress the hunting of the exposure control. Then, the process returns to the step S1 again, wherein it is determined again whether or not the exposure is appropriate.

As described hereinabove, in the present embodiment, the ND filter 161 includes the transparent portion 161*a* for selectively opening and closing the aperture 120*a* of the diaphragm mechanism 120, and the gradation portion 161*b*, and the transparent portion 161*a* is caused to perform the opening or closing operation at a higher speed than the gradation portion 161*b*.

This makes it possible to suppress the density step using the transparent portion 161*a*, and suppress the thickness step and the density step using the gradation portion 161*b*. Further, since the transparent portion 161*a* of the ND filter 161 is caused to perform the opening/closing operation at high speed, it is possible to suppress the thickness step at the transparent portion 161*a*.

This makes it possible to prevent light diffraction from being caused by the density step or the thickness step of the ND filter 161, thereby making it possible to prevent the resolution from being degraded during still image shooting. Further, it is possible to secure the dynamic range of the exposure control using a filter during moving image shooting and still image shooting.

Further, since a luminance shock can be effectively suppressed by the high-speed opening/closing operation of the transparent portion 161*a* of the ND filter 161, it is possible to ensure the continuity of luminance not only in a still image but also in a moving image.

It should be noted that although in the present embodiment, it is assumed that the transmittance of the transparent portion 161*a* is 97%, and for the exposure control, the luminance change value Y1 corresponding to 3% of the luminance value of incident light on the ND filter 161 provides a hysteresis, the transmittance may be any suitable value between 90% and 100%. Further, if the hysteresis of the luminance change value Y1 for use in the exposure control is provided in a range between 1% and 10% in accordance with the transmittance, it is possible to obtain the same advantageous effects as provided by the above-described embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-207139 filed Jul. 28, 2006, which is hereby incorporated by reference herein in its entirety.

The invention claimed is:

1. An image pickup apparatus comprising:
   an image pickup element that converts light incident thereon from a lens into an electric signal;
   a diaphragm mechanism that changes an amount of light incident on said image pickup element;
   a filter that covers an aperture of said diaphragm mechanism such that the aperture is openable and closable, to adjust the amount of light incident on said image pickup element after passing through the aperture, said filter having a transparent portion for selectively opening and closing the aperture of said diaphragm mechanism, and a gradation portion; and
   a controller that controls a closing operation of said filter for closing the aperture, such that the closing operation is performed at different speeds between when said gradation portion covers the aperture of said diaphragm mechanism and when said transparent portion covers the aperture of said diaphragm mechanism.

2. An image pickup apparatus as claimed in claim 1, wherein said controller controls the closing operation of said filter such that the closing operation is performed at a higher speed when said transparent portion covers the aperture of said diaphragm mechanism than when said gradation portion covers the aperture of said diaphragm mechanism.

3. An image pickup apparatus as claimed in claim 1, wherein said controller controls an opening operation of said filter for opening the aperture, such that the opening operation is performed at a higher speed when said transparent portion is retracted from the aperture of said diaphragm mechanism than when said gradation portion is retracted from the aperture of said diaphragm mechanism.

4. An image pickup apparatus as claimed in claim 1, wherein a speed at which the closing operation of said filter is performed when said gradation portion covers the aperture of said diaphragm mechanism is equivalent to a speed at which a light amount is changed by said diaphragm mechanism.

5. An image pickup apparatus as claimed in claim 1, wherein said controller causes said filter to perform the closing operation such that said transparent portion covers a whole area of the aperture of said diaphragm mechanism, when said filter shifts from a state in which said filter is retracted from the aperture to a state in which said filter covers the aperture.

6. An image pickup apparatus as claimed in claim 5, wherein said controller causes said filter to perform an opening operation for opening the aperture of said diaphragm mechanism such that said filter is retracted from the aperture from the state in which said transparent portion covers the whole area of the aperture.

7. An image pickup apparatus as claimed in claim 1, wherein said controller controls the aperture of said diaphragm mechanism such that a size of the aperture becomes equal to or smaller than that of said transparent portion, when said filter shifts from a state in which said filter is retracted from the aperture to a state in which said filter covers the aperture.

8. An image pickup apparatus as claimed in claim 1, wherein said controller controls the aperture of said diaphragm mechanism such that a size of the aperture becomes equal to or smaller than that of said transparent portion, when said filter shifts from a state in which only said transparent portion of said filter covers the aperture to a state in which said filter is retracted from the aperture.

9. An image pickup apparatus as claimed in claim 1, wherein said controller causes said filter to perform the closing operation such that said transparent portion covers the aperture during a blanking period of vertical scanning, when said filter shifts from a state in which said filter is retracted from the aperture to a state in which said filter covers the aperture.

10. An image pickup apparatus as claimed in claim 1, wherein said controller causes said filter to perform an opening operation for opening the aperture of said diaphragm mechanism such that said filter is retracted from the aperture during a blanking period of vertical scanning, when said filter shifts from a state in which only said transparent portion of said filter covers the aperture to a state in which said filter is retracted from the aperture.

11. An image pickup apparatus as claimed in claim 1, further comprising:
a luminance value-generating unit that converts the electric signal output from said image pickup element to a luminance value,
wherein when said filter shifts from a state in which said filter is retracted from the aperture of said diaphragm mechanism to a state in which said filter covers the aperture, said controller causes said filter to perform the closing operation such that said transparent portion covers the aperture, when the luminance value generated by said luminance value-generating unit becomes different from a preset luminance target value by a predetermined level.

12. An image pickup apparatus as claimed in claim 11, wherein when said filter shifts from a state in which only said transparent portion of said filter covers the aperture of said diaphragm mechanism to a state in which said filter is retracted from the aperture, said controller causes said filter to perform an opening operation for opening the aperture of said diaphragm mechanism such that said filter is retracted from the aperture, when the luminance value generated by said luminance value-generating unit becomes different from a preset luminance target value by a predetermined level.

13. An image pickup apparatus as claimed in claim 1, further comprising:
a luminance value-generating unit for converting the electric signal output from said image pickup element to a luminance value,
wherein when said filter shifts from a state in which only said transparent portion of said filter covers the aperture of said diaphragm mechanism to a state in which said filter is retracted from the aperture, said controller causes said filter to perform an opening operation for opening the aperture of said diaphragm mechanism such that said filter is retracted from the aperture, when the luminance value generated by said luminance value-generating unit becomes different from a present luminance target value by a predetermined level.

14. An image pickup apparatus comprising:
an image pickup element that converts light incident thereon from a lens into an electric signal;
a diaphragm mechanism that changes an amount of light incident on said image pickup element;
a filter that covers an aperture of said diaphragm mechanism such that the aperture is openable and closable, thereby adjusting the amount of light incident on said image pickup element after passing through the aperture, said filter having a transparent portion for selectively opening and closing the aperture of said diaphragm mechanism, and a gradation portion; and
a controller that controls an opening operation of said filter for opening the aperture, such that the opening operation is performed at different speeds between when said gradation portion retracts from the aperture of said diaphragm mechanism and when said transparent portion retracts from the aperture of said diaphragm mechanism.

15. A method of controlling a diaphragm mechanism and a filter of an image pickup apparatus having an image pickup element that converts light incident thereon from a lens into an electric signal, the diaphragm mechanism changing an amount of light incident on the image pickup element through an aperture thereof, and the filter having a transparent portion for selectively opening and closing the aperture of said diaphragm mechanism, and a gradation portion, the method comprising the steps of:
covering the aperture of the diaphragm mechanism with the filter such that the aperture is openable and closable, to adjust the amount of light incident on the image pickup element after passing through the aperture; and
controlling a closing operation of the filter for closing the aperture, such that the closing operation is performed at different speeds between when the gradation portion covers the aperture of the diaphragm mechanism and when the transparent portion covers the aperture of the diaphragm mechanism.

16. A method of controlling a diaphragm mechanism and a filter of an image pickup apparatus having an image pickup element that converts light incident thereon from a lens into an electric signal, the diaphragm mechanism changing an amount of light incident on the image pickup element through an aperture thereof, and the filter having a transparent portion for selectively opening and closing the aperture of said diaphragm mechanism, and a gradation portion, the method comprising the steps of:
covering the aperture of the diaphragm mechanism with the filter such that the aperture is openable and closable, thereby adjusting the amount of light incident on the image pickup element after passing through the aperture; and
controlling an opening operation of the filter for opening the aperture, such that the opening operation is performed at different speeds between when the gradation portion retracts from the aperture of the diaphragm mechanism and when the transparent portion retracts from the aperture of the diaphragm mechanism.

* * * * *